United States Patent
Usui et al.

(10) Patent No.: US 12,522,546 B2
(45) Date of Patent: Jan. 13, 2026

(54) METHOD FOR PRODUCING FLUOROETHYLENE

(71) Applicant: DAIKIN INDUSTRIES, LTD., Osaka (JP)

(72) Inventors: Takashi Usui, Osaka (JP); Tsubasa Nakaue, Osaka (JP); Tomoyuki Iwamoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 578 days.

(21) Appl. No.: 17/992,219

(22) Filed: Nov. 22, 2022

(65) Prior Publication Data

US 2023/0096389 A1     Mar. 30, 2023

Related U.S. Application Data

(63) Continuation of application No. PCT/JP2021/019896, filed on May 26, 2021.

(30) Foreign Application Priority Data

May 27, 2020  (JP) ................................. 2020-092087

(51) Int. Cl.
    *C07C 17/20*     (2006.01)
(52) U.S. Cl.
    CPC ................... *C07C 17/208* (2013.01)
(58) Field of Classification Search
    CPC ............... C07C 17/208; C07C 21/18
    See application file for complete search history.

(56) References Cited

U.S. PATENT DOCUMENTS

| 5,045,634 A | 9/1991 | Fernandez et al. |
| 2021/0163381 A1 | 6/2021 | Komatsu |

FOREIGN PATENT DOCUMENTS

| GB | 359997 | 6/1930 |
| JP | 5-508635 | 12/1993 |
| JP | 2016-056132 | 4/2016 |
| JP | 2019-196312 | 11/2019 |

OTHER PUBLICATIONS

Rausch et al., the addition of fluorine to halogenated olefins by means of metal fluorides, (The Dow Chemical company, Midland, Michigan Jul. 6, 1962). (Year: 1962).*
International Search Report issued Jul. 27, 2021 in International (PCT) Application No. PCT/JP2021/019896.
Ishikawa et al., "E. F substitution by KF", Fluorine Compounds-Its Chemistry and Applications, 1979, pp. 84-87, with partial English translation.
"15.5.1 Organofluorine compound", Kagaku Binran Applied Chemistry, 7th edition, 2014, pp. 892-895, with partial English translation.
Extended European Search Report issued Jul. 29, 2024 in corresponding European Patent Application No. 21813881.6.
International Preliminary Report on Patentability issued Nov. 17, 2022 in International (PCT) Application No. PCT/JP2021/019896.

* cited by examiner

*Primary Examiner* — Jafar F Parsa
(74) *Attorney, Agent, or Firm* — Wenderoth, Lind & Ponack, L.L.P.

(57) ABSTRACT

An object of the present invention is to provide a method for efficiently obtaining fluoroethylene. A method for producing HFO-1132(Z/E) comprising reacting a halogenated ethylene represented by formula (1): $CHX^1=CHX^2$ (1), wherein $X^1$ and $X^2$ are identical or different, and each represents chlorine, bromine, or iodine, with a metal fluoride. A method for producing HFO-1123, comprising reacting a halogenated ethylene represented by formula (2): $CX^3X^4=CHX^5$ (2), wherein $X^3$, $X^4$, and $X^5$ are identical or different, and each represents chlorine, bromine, or iodine, with a metal fluoride.

10 Claims, No Drawings

METHOD FOR PRODUCING FLUOROETHYLENE

TECHNICAL FIELD

The present disclosure relates to a method for producing fluoroethylene.

BACKGROUND ART

Patent Literature 1 discloses a method for producing 1,2-difluoroethylene (HFO-1132), comprising reacting 1-chloro-1,2-difluoroethylene (HCFO-1122a) and hydrogen in a gas phase in the presence of a hydrogenated catalyst.

CITATION LIST

Patent Literature

PTL 1: JP2016-56132

SUMMARY

Item 1.

A method for producing at least one fluoroethylene compound selected from the group consisting of (Z)- and/or (E)-1,2-difluoroethylene (HFO-1132(Z/E)) and 1,1,2-trifluoroethylene (HFO-1123), the method comprising reacting at least one halogenated ethylene compound selected from the group consisting of halogenated ethylenes represented by formula (1):

$$CHX^1\!=\!CHX^2 \tag{1},$$

wherein $X^1$ and $X^2$ are identical or different, and each represents chlorine, bromine, or iodine, and halogenated ethylenes represented by formula (2):

$$CX^3X^4\!=\!CHX^5 \tag{2}$$

wherein $X^3$, $X^4$, and $X^3$ are identical or different, and each represents chlorine, bromine, or iodine, with a metal fluoride.

In the present specification, the following terms are described as below.

(Z)- and/or (E)-1,2-difluoroethylene: HFO-1132(Z/E)
HFO-1132(E): Trans-1,2-difluoroethylene, (E)-1,2-difluoroethylene
HFO-1132(Z): Cis-1,2-difluoroethylene, (Z)-1,2-difluoroethylene
(E)-1,2-dichloroethylene: HCC-1130(E)
(Z)-1,2-dichloroethylene: HCC-1130(Z)
1,1,2-Trifluoroethylene: HFO-1123
1,1,2-Trichloroethylene: HCC-1120

Advantageous Effects of Invention

According to the present disclosure, fluoroethylene can be efficiently obtained.

DESCRIPTION OF EMBODIMENTS

An object of the present disclosure is to provide a means for solving the above problems. The present inventors conducted extensive research and found that, for example, a fluoroethylene compound of HFO-1132(E), HFO-1132(Z), or HFO-1123 can be efficiently produced by respectively reacting a halogenated ethylene compound (chloroethylene compound) of HCC-1130(E), HCC-1130(Z), or HCC-1120 with a metal fluoride; and that the above problems can be solved.

This disclosure was accomplished as a result of further research based on the above findings. The present invention includes the following embodiments.

The production method of the present disclosure is a method for producing at least one fluoroethylene compound selected from the group consisting of HFO-1132(Z/E) and HFO-1123, comprising reacting at least one halogenated ethylene compound selected from the group consisting of halogenated ethylenes represented by formula (1):

$$CHX^1\!=\!CHX^2 \tag{1},$$

wherein $X^1$ and $X^2$ are identical or different, and each represents chlorine, bromine, or iodine, and halogenated ethylenes represented by formula (2):

$$CX^3X^4\!=\!CHX^5 \tag{2},$$

wherein $X^3$, $X^4$, and $X^5$ are identical or different, and each represents chlorine, bromine, or iodine with a metal fluoride.

The production method of the present disclosure is preferably a method for producing HFO-1132(Z/E) comprising reacting a halogenated ethylene represented by formula (1):

$$CHX^1\!=\!CHX^2 \tag{1},$$

wherein $X^1$ and $X^2$ are identical or different, and each represents chlorine, bromine, or iodine, with a metal fluoride.

The production method of the present disclosure is preferably a method for producing HFO-1132(E), comprising reacting HCC-1130(E) with a metal fluoride.

The production method of the present disclosure is preferably a method for producing HFO-1132(Z), comprising reacting HCC-1130(Z) with a metal fluoride.

The production method of the present disclosure is preferably a method for producing HFO-1123, comprising reacting a halogenated ethylene represented by formula (2):

$$CX^3X^4\!=\!CHX^5 \tag{2}$$

wherein $X^3$, $X^4$, and $X^5$ are identical or different, and each represents chlorine, bromine, or iodine, with a methyl fluoride.

The production method of the present disclosure is preferably a method for producing HFO-1123, comprising reacting HCC-1120 with a metal fluoride.

In the production method of the present disclosure, the metal fluoride is preferably at least one metal fluoride selected from the group consisting of lithium fluoride, sodium fluoride, potassium fluoride, rubidium fluoride, cesium fluoride, silver fluoride, nickel fluoride, cobalt fluoride, chromium fluoride, vanadium fluoride, and manganese fluoride.

In the production method of the present disclosure, the reaction is preferably performed at a temperature of 100° C. or more.

In the production method of the present disclosure, the reaction is preferably performed in such a manner that the molar ratio of the metal fluoride is 0.1 to 20 mol per mol of the halogenated ethylene used as a raw material compound (the molar ratio of the metal fluoride/halogenated ethylene of the raw material compound).

The production method of the present disclosure can produce a fluoroethylene compound of HFO-1132(E), HFO-1132(2), or HFO-1123 (target compound) respectively from a halogenated ethylene compound (chloroethylene compound) of HCC-1130(E), HCC-1130(Z), or HCC-1120 (raw material compound) by a one-step (one-pot synthesis).

In particular, in the production method of the present disclosure, for example, HFO-1132(E) (target compound) can be efficiently and selectively produced in case of using a raw material compound (substrate), without producing the mixture of (Z) and (E) from HCC-1130(E) (raw material compound).

In particular, in the production method of the present disclosure, for example, HFO-1132(Z) (target compound) can be efficiently and selectively produced in case of using a raw material compound (substrate), without producing the mixture of (Z) and (E) from HCC-1130(Z) (raw material compound).

In this disclosure, the reaction pressure is a gauge pressure unless otherwise specified.

1. Raw Material Compound

In the production method of the present disclosure, HFO-1132(Z/E) is produced by reacting a halogenated ethylene represented by formula (1):

$$CHX^1=CHX^2 \qquad (1),$$

wherein $X^1$ and $X^2$ are identical or different, and each represents chlorine, bromine, or iodine, with a metal fluoride.

In the method for producing HFO-1132(Z/E) of the present disclosure, the halogenated ethylene (raw material compound) represented by formula (1) is preferably HCC-1130 (E) or HCC-1130(Z).

In the production method of the present disclosure, HFO-1123 can be produced by reacting a halogenated ethylene represented by formula (2):

$$CX^3X^4=CHX^5 \qquad (2)$$

wherein $X^3$, $X^4$, and $X^5$ are identical or different, and each represents chlorine, bromine, or iodine, with a metal fluoride.

In the method for producing HFO-1123 of the present disclosure, the halogenated ethylene (raw material compound) represented by formula (2) is preferably HCC-1120.

The raw material compounds used in the production method of the present disclosure are halogenated ethylenes. The halogenated ethylenes, such as HCC-1130(E), HCC-1130(Z), and HCC-1120 are widely used for applications, such as refrigerants, solvents, foaming agents, and propellants, and are generally available.

2. Step of Reacting Raw Material Compound with Metal Fluoride

The production method of the present disclosure is preferably a liquid-phase reaction in batch mode.

In the production method of the present disclosure, HFO-1132(Z/E) or HFO-1123 is respectively produced according to the raw material compound by reacting a halogenated ethylene (raw material compound) represented by formula (1): $CHX^1=CHX^2$ or a halogenated ethylene (raw material compound) represented by formula (2): $CX^3X^4=CHX^5$, with a metal fluoride.

According to the production method of the present disclosure, the target compound can be individually produced by a one-step (one-pot synthesis) from the raw material compound.

In particular, in the production method of the present disclosure, for example, HFO-1132(E) or HFO-1132(Z) (target compound) can be efficiently and selectively produced in case of using a raw material compound (substrate), respectively, without producing the mixture of (Z) and (E) from HCC-1130(E) or HCC-1130(Z) (raw material compound).

In the production of HFO-1132(E) or HFO-1132(Z) as a target compound, HCFO-1131(E) and/or HCFO-1131(Z) can be obtained as a synthetic intermediate. Accordingly, it is preferable to separate such a synthetic intermediate, and react the synthetic intermediate and HCC-1130(E) or HCC-1130(Z) (raw material compound) with a metal fluoride, thus producing HFO-1132(E) or HFO-1132(Z).

In the present disclosure, when HOC-1130(E) is used as a raw material compound, the target compound HFO-1132 (E) can be efficiently produced. In the present disclosure, when HCC-1130(Z) is used as a raw material compound, the target compound HFO-1132(Z) can be efficiently produced; and when HCC-1120 is used, the target compound HFO-1123 can be efficiently produced.

The step of reacting the raw material compound with a metal fluoride in the present disclosure can be performed in gas phase flow mode or batch mode without any particular limitation. The step of reacting a raw material compound with a metal fluoride in the present disclosure is preferably performed in a liquid phase in batch mode. This ensures sufficient reaction time and improves the conversion rate of the raw material compound.

Metal Fluoride (MF)

The step of reacting a halogenated ethylene (raw material compound) with a metal fluoride in the present disclosure preferably uses at least one metal fluoride selected from the group consisting of lithium fluoride, sodium fluoride, potassium fluoride, rubidium fluoride, cesium fluoride, silver fluoride, nickel fluoride, cobalt fluoride, chromium fluoride, vanadium fluoride, and manganese fluoride.

In the step of reacting a halogenated ethylene (raw material compound) with a metal fluoride in the present disclosure, the amount of the metal fluoride is not limited. The molar ratio of the metal fluoride (the amount of the metal fluoride) is 0.1 to 20 mol per mol of the halogenated ethylene used as a raw material compound (the molar ratio of the metal fluoride/halogenated ethylene of the raw material compound). The mount of the metal fluoride is preferably 1 to 10 mol (the molar ratio of the metal fluoride/raw material compound).

Reaction Solvent

The production method of the present disclosure is preferably a liquid-phase reaction in batch mode using a reaction solvent.

The step of reacting a halogenated ethylene (raw material compound) with a metal fluoride in the present disclosure preferably uses, as a solvent, a polar solvent with a high boiling point, because the reaction temperature reaches 100° C. or more and the metal fluoride is dissolved to obtain a sufficient conversion rate.

The polar solvent with a high boiling point is not limited. The polar solvent with a high boiling point is more preferably N-methylpyrrolidone, dimethylformamide, dimethylacetamide, dimethylsulfoxide, acetonitrile, 2-pyrrolidone, 1,3-dimethyl-2-imidazolidinone, tetraglyme, an ionic liquid, or the like.

Temperature of Reaction

In the step of reacting the halogenated ethylene (raw material compound) with a metal fluoride in the present disclosure, the lower limit of the reaction temperature is typically about 100° C., preferably about 180° C., and more preferably about 190° C., from the standpoint of more efficiently performing the reaction to obtain the target compound at a higher selectivity and suppressing a decrease in the conversion rate.

The upper limit of the reaction temperature is typically about 500° C., and preferably about 300° C. from the standpoint of more efficiently performing the reaction of the halogenated ethylene (raw material compound) with a metal fluoride to obtain the target compound at a higher yield and suppressing a decrease in selectivity due to decomposition or polymerization of the reaction product.

The step of reacting the halogenated ethylene (raw material compound) with a metal fluoride in the present disclosure is preferably performed in the range of about 100 to 500° C.

Time Period of Reaction

In the step of reacting the halogenated ethylene (raw material compound) and a metal fluoride in the present disclosure, the reaction time is preferably 1 hour (h) to 30 hours (h), and more preferably 9 hours (h) to 15 hours (h) from the standpoint of increasing the conversion rate of the raw material compound.

In the reaction, the reactor in which a halogenated ethylene (raw material compound) and a metal fluoride are brought into contact with each other and reacted is not limited in terms of shape and structure as long as the reactor is resistant to temperature and pressure. Examples of reactors include vertical reactors, horizontal reactors, and multi-tube reactors. Examples of reactor materials include glass, stainless steel, iron, nickel, and iron nickel alloy.

Reaction Pressure

In the step of reacting a halogenated ethylene (raw material compound) and a metal fluoride in the present disclosure, the reaction pressure is preferably ordinary pressure to 1.5 MPa, and more preferably ordinary pressure to 1.0 MPa, from the standpoint of improving the reaction speed. In the present disclosure, the reaction pressure is a gauge pressure unless indicated otherwise.

Examples of Reaction

In the step of reacting the halogenated ethylene (raw material compound) and a metal fluoride in the present disclosure, the reaction can be performed in flow mode in which a raw material compound is continuously added to a reactor, and a target compound is continuously taken out from the reactor; or the reaction can be performed in batch mode. Because a sufficient mixing time can be ensured, the reaction is preferably performed in batch mode.

Step of Recycling

In the present disclosure, in order to collect a composition with a higher proportion of a fluoroethylene compound of HFO-1132(E), HFO-1132(Z), or HFO-1123 (target compound), a halogenated ethylene of HCC-1130(E), HCC-1130(Z), or HCC-1120 (raw material compound) can be collected and recycled to the reaction after the step of reacting the raw material compound with the metal fluoride.

The present disclosure preferably comprises, after the step of reacting the raw material compound and a metal fluoride (MF), the step of collecting the fluoroethylene compound of HFO-1132(5), HFO-1132(Z), or HFO-1123 (target compound) from the reaction product, and separating a stream mainly comprising a halogenated ethylene of HCC-1130(E), HCC-1130(Z), or HCC-1120 (raw material compound), and a stream mainly comprising a metal chloride (MCl) produced after the reaction.

The present disclosure preferably comprises the step of recycling at least part of the separated stream mainly comprising the halogenated ethylene compound of HOC-1130 (E), HCC-1130(Z), or HCC-1120 to the above reaction to react with the metal fluoride (MF) again. In the present disclosure, it is preferable to collect the fluoroethylene compound of HFO-1132(E), HFO-1132(Z), or HFO-1123 (target compound) repeatedly, thus obtaining a composition in which the proportion of the target compound is more increased.

Method for Producing HFO-1132(E) Comprising Step of Recycling

The method for producing HFO-1132(E) comprises the step of reacting HCC-1130(E) and a metal fluoride, and preferably comprises, after the reaction, the step of collecting HFO-1132(E) from the reaction product, and separating a stream mainly comprising HCC-1130(E) and a stream mainly comprising a metal chloride generated after the reaction; and the step of recycling at least part of the stream mainly comprising HCC-1130(E) to the reaction to react with the metal fluoride again.

Method for Producing HFO-1132(Z) Comprising Step of Recycling

The method for producing HFO-1132(Z) comprises the step of reacting HCC-1130(Z) and a metal fluoride, and preferably comprises, after the reaction, the step of collecting HFO-1132(Z) from the reaction product, and separating a stream mainly comprising HCC-1130(Z) and a stream mainly comprising a metal chloride generated after the reaction; and the step of recycling at least part of the stream mainly comprising HCC-1130(Z) to the reaction to react with the metal fluoride again.

Method for Producing HFO-1123 Comprising Step of Recycling

The method for producing HFO-1123 comprises the step of reacting HCC-1120 and a metal fluoride, and preferably comprises, after the reaction, the step of collecting HFO-1123 from the reaction product, and separating a stream mainly comprising HCC-1120 and a stream mainly comprising a metal chloride generated after the reaction; and the step of recycling at least part of the stream mainly comprising MCC-1120 to the reaction to react with the metal fluoride again.

3. Target Compound

In the production method of the present disclosure, HFO-1132(Z/E) or HFO-1123 is respectively produced according to the raw material compound, by reacting a halogenated ethylene (raw material compound) represented by formula (1): $CHX^1=CHX^2$ or a halogenated ethylene (raw material compound) represented by formula (2): $CX^3X^4=CHX^5$ with a metal fluoride.

In particular, in the production method of the present disclosure, for example, HFO-1132(E) or HFO-1132(Z) (target compound) can be efficiently and selectively produced in case of using a raw material compound (substrate), respectively, without producing the mixture of (Z) and (E) from HCC-1130(E) or HCC-1130(Z) (raw material compound).

In the present disclosure, the target compound HFO-1132 (E) can be produced when HCC-1130(E) is used as a raw material compound. In the present disclosure, the target compound HFO-1132(Z) can be produced when HCC-1130 (Z) is used as a raw material compound. In the present disclosure, the target compound HFO-1123 can be produced when HCC-1120 is used as a raw material compound.

The target compound of the production method of the present disclosure is HFO-1132(E), HFO-1132(Z), or HFO-1123. The HFO-1132(E), HFO-1132M, or HFO-1123 produced by the production method of the present disclosure can be effectively used in various applications, including refrigerants, solvents, foaming agents, propellants, raw materials for resin products, organic synthesis intermediates, heat media, etc.

Item 1.

A method for producing at least one fluoroethylene compound selected from the group consisting of (Z)- and/or (E)-1,2-difluoroethylene (HFO-1132(Z/E)) and 1,1,2-trifluoroethylene (HFO-1123), the method comprising reacting at least one halogenated ethylene compound selected from the group consisting of halogenated ethylenes represented by formula (1):

$$CHX^1=CHX^2 \quad (1),$$

wherein $X^1$ and $X^2$ are identical or different, and each represents chlorine, bromine, or iodine, and halogenated ethylenes represented by formula (2):

$$CX^3X^4=CHX^5 \quad (2)$$

wherein $X^3$, $X^4$, and $X^5$ are identical or different, and each represents chlorine, bromine, or iodine, with a metal fluoride.

Item 2.

The production method according to Item 1, wherein the method is for producing (Z)- and/or (E)-1,2-difluoroethylene (HFO-1132(Z/E)), and comprises reacting a halogenated ethylene represented by formula (1):

$$CHX^1=CHX^2 \quad (1),$$

wherein $X^1$ and $X^2$ are identical or different, and each represents chlorine, bromine, or iodine, with a metal fluoride.

Item 3.

The production method according to Item 1 or 2, wherein the method is for producing (E)-1,2-difluoroethylene (HFO-1132(E)), and comprises reacting (E)-1,2-dichloroethylene (HCC-1130(E)) with a metal fluoride.

Item 4.

The production method according to Item 3, comprising, after the reaction, collecting HFO-1132(E) from a reaction product, and separating a stream mainly comprising HCC-1130(E) and a stream mainly comprising a metal chloride produced after the reaction; and recycling at least part of the stream mainly comprising HCC-1130(E) to the reaction to react with a metal fluoride again.

Item 5.

The production method according to Item 1 or 2, wherein the method is for producing (Z)-1,2-difluoroethylene (HFO-1132(Z)), and comprises reacting (Z)-1,2-dichloroethylene (HCC-1130(Z)) with a metal fluoride.

Item 6.

The production method according to Item 5, comprising, after the reaction, collecting HFO-1132 (Z) from a reaction product, and separating a stream mainly comprising HCC-1130(Z) and a stream mainly comprising a metal chloride produced after the reaction; and recycling at least part of the stream mainly comprising HCC-1130(Z) to the reaction to react with a metal fluoride again.

Item 7.

The production method according to Item 1, wherein the method is for producing 1,1,2-trifluoroethylene (HFO-1123), and comprises reacting a halogenated ethylene represented by formula (2):

$$CX^3X^4=CHX^5 \quad (2),$$

wherein $X^3$, $X^4$, and $X^5$ are identical or different, and each represents chlorine, bromine, or iodine, with a metal fluoride.

Item 8.

The production method according to Item 1 or 7, wherein the method is for producing 1,1,2-trifluoroethylene (HFO-1123), and comprises reacting 1,1,2-trichloroethylene (HCC-1120) with a metal fluoride.

Item 9.

The production method according to Item 8, comprising, after the reaction, collecting HFO-1123 from a reaction product, and separating a stream mainly comprising HCC-1120 and a stream mainly comprising a metal chloride produced after the reaction; and recycling at least part of the stream mainly comprising HCC-1120 to the reaction to react with a metal fluoride again.

Item 10.

The production method according to any one of Items 1 to 9, wherein the metal fluoride is at least one metal fluoride selected from the group consisting of lithium fluoride, sodium fluoride, potassium fluoride, rubidium fluoride, cesium fluoride, silver fluoride, nickel fluoride, cobalt fluoride, chromium fluoride, vanadium fluoride, and manganese fluoride.

Item 11.

The production method according to any one of Items 1 to 10, wherein the reaction is performed at a temperature of 100° C. or more.

Item 12.

The production method according to any one of Items 1 to 11, wherein the reaction is performed in such a manner that the molar ratio of the metal fluoride is 0.1 to 20 mol per mol of the halogenated ethylene used as a raw material compound (the molar ratio of the metal fluoride/halogenated ethylene of the raw material compound).

EXAMPLES

The present disclosure is explained with reference to Examples; however, the present disclosure is not limited to these Examples.

Examples 1 to 3

Production of HFO-1132(E) in the Absence of Solvent

HCC-1130(E) (halogenated ethylene of a raw material compound) was reacted with a metal fluoride (MF) (KF (potassium fluoride), CsF (cesium fluoride), or AgF (silver fluoride)) in a reactor to produce HFO-1132(E) (target compound).

After the reaction time had passed, the gas phase was taken as a sample, and analyzed by gas chromatography (GC). The pressure during the reaction was 0.2 MPa.

HCC-1130(E) (raw material compound): 5 mmol

Metal fluoride (MF) (KF, CsF, or AgF): 15 mmol

Time of reaction: 12 hours

Reaction temperature: 195° C.

Reactor: ordinal glass sealed container (sealed tube)

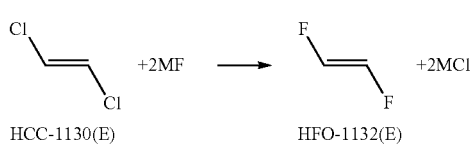

TABLE 1

Table 1

| | | Gas phase GC(%) | | | | | | | | | |
|---|---|---|---|---|---|---|---|---|---|---|---|
| Ex. | MF | Raw material compound HCC-1130(E) | Target compound HFO-1132(E) | HFO-1132(Z) | HFC-23 | $C_2H_2$ | 2F | HFC-143a | H—C≡C—Cl | (E)-HCFO-1131 | Others |
| 1 | KF | 99.06 | 0.13 | n.d. | n.d. | 0.01 | n.d. | n.d. | n.d. | 0.03 | 0.77 |
| 2 | CsF | 88.96 | 0.004 | n.d. | 0.032 | 1.146 | 5.21 | 0.83 | 1.84 | 0.07 | 1.91 |
| 3 | AgF | 65.01 | 1.64 | n.d. | 0.03 | n.d. | 8.78 | 0.90 | n.d. | 0.10 | 23.54 |

Ex.: Example
HFC-23: Trifluoromethane
2F: 1,1-Difluoroethylene
HFC-143a: 1,1,1-Trifluoroethane
(E)-HCFO-1131: E-1-chloro-2-fluoroethylene In Examples 1 to 3, a batch reaction (in the absence of a solvent) was performed for a reaction time of 12 hours. After completion of the reaction, gas was extracted from the glass container, and the gas phase was evaluated by GC %. The data in the table indicate the concentrations actually evaluated by gas chromatography (GC).

The "conversion rate" indicates the concentration of the raw material compound. The lower the concentration (low concentration), the higher the conversion rate.

The "selectivity" indicates the proportion of HFO-1132 (E) in the concentration of compounds other than the raw material compound.

According to the production method of the present disclosure, by reacting HCC-1130(E) (raw material compound) with a metal fluoride (MF) (KF, CsF, or AgF), HFO-1132(E) (target compound) was efficiently synthesized with high selectivity, without producing the mixture of (Z) and (E).

Examples 4 to 9

Production of HFO-1132(E) in the Presence of Solvent

HCC-1130(E) (halogenated ethylene of a raw material compound) was reacted with a metal fluoride (ME) in a reactor in the presence of a solvent to produce HFO-1132(E) (target compound).

After the reaction time had passed, the gas phase was taken as a sample, and analyzed by gas chromatography (GC). The pressure during the reaction was 0.1 MPa.

HCC-1130(E) (raw material compound): 5 mmol
Metal fluoride MF: 15 mmol
Solvent: DMI (1,3-dimethyl-2-imidazolidinone), 3 mL
Reactor: SUS sealed container

TABLE 2

Table 2

| | | | | Gas phase GC(%) | | | | | | | | | |
|---|---|---|---|---|---|---|---|---|---|---|---|---|---|
| Ex. | MF | Temp. (° C.) | Time (h) | Raw material compound HCC-1130(E) | Target compound HFO-1132(E) | HFO-1132(Z) | HFC-23 | $C_2H_2$ | 2F | HFC-143a | H—C≡C—Cl | (E)-HCFO-1131 | Others |
| 4 | CsF | 110 | 12 | 93.53 | 0.015 | 0 | 0 | 1.844 | 0.077 | 0 | 2.9 | 0.428 | 1.206 |
| 5 | $NiF_2$ | 110 | 12 | 99.18 | 0.003 | 0 | 0.023 | 0.18 | 0 | 0 | 0.004 | 0.053 | 0.557 |
| 6 | AgF | 110 | 12 | 48.735 | 0.004 | 0 | 0.015 | 0 | 0.084 | 27.653 | 0 | 4.3 | 19.209 |
| 7 | AgF | 150 | 6 | 46.438 | 0.004 | 0 | 0.03 | 1.947 | 0.074 | 27.832 | 0 | 4.06 | 19.615 |

Ex.: Example
Temp. (° C.): Temperature (° C.)

According to the production method of the present disclosure, by reacting HOC-1130(E) (raw material compound) and the metal fluoride (MF) (KF, CsF, or AgF) in batch mode in the presence of a solvent, the HFO-1132(E) (target compound) was efficiently synthesized in case of using HCC-1130(E) (raw material compound) with high selectively, without producing the mixture of (Z) and (E).

In terms of conversion rate, the use of AgF as a metal fluoride enabled HFO-1130(E) to be reacted with a high conversion rate.

The invention claimed is:

1. A production method,
    wherein the method is for producing (E)-1,2-difluoroethylene (HFO-1132(E)), and comprises reacting (E)-1,2-dichloroethylene (HCC-1130(E)) with a metal fluoride.

2. The production method according to claim 1, comprising,
    after the reaction,
    collecting HFO-1132(E) from a reaction product, and separating a stream mainly comprising HCC-1130(E) and a stream mainly comprising a metal chloride produced after the reaction; and
    recycling at least part of the stream mainly comprising HCC-1130(E) to the reaction to react with a metal fluoride again.

3. A production method,
    wherein the method is for producing (Z)-1,2-difluoroethylene (HFO-1132 (Z)), and comprises reacting (Z)-1,2-dichloroethylene (HCC-1130 (Z)) with a metal fluoride.

4. The production method according to claim 3, comprising,
after the reaction,
collecting HFO-1132 (Z) from a reaction product, and
separating a stream mainly comprising HCC-1130 (Z) and a stream mainly comprising a metal chloride produced after the reaction; and
recycling at least part of the stream mainly comprising HCC-1130 (Z) to the reaction to react with a metal fluoride again.

5. The production method according to claim 1, wherein the metal fluoride is at least one metal fluoride selected from the group consisting of lithium fluoride, sodium fluoride, potassium fluoride, rubidium fluoride, cesium fluoride, silver fluoride, nickel fluoride, cobalt fluoride, chromium fluoride, vanadium fluoride, and manganese fluoride.

6. The production method according to claim 1, wherein the reaction is performed at a temperature of 100° C. or more.

7. The production method according to claim 1, wherein the reaction is performed in such a manner that the molar ratio of the metal fluoride is 0.1 to 20 mol per mol of the halogenated ethylene used as a raw material compound (the molar ratio of the metal fluoride/halogenated ethylene of the raw material compound).

8. The production method according to claim 3, wherein the metal fluoride is at least one metal fluoride selected from the group consisting of lithium fluoride, sodium fluoride, potassium fluoride, rubidium fluoride, cesium fluoride, silver fluoride, nickel fluoride, cobalt fluoride, chromium fluoride, vanadium fluoride, and manganese fluoride.

9. The production method according to claim 3, wherein the reaction is performed at a temperature of 100° C. or more.

10. The production method according to claim 3, wherein the reaction is performed in such a manner that the molar ratio of the metal fluoride is 0.1 to 20 mol per mol of the halogenated ethylene used as a raw material compound (the molar ratio of the metal fluoride/halogenated ethylene of the raw material compound).

* * * * *